US011077727B2

(12) United States Patent
Schwegler et al.

(10) Patent No.: US 11,077,727 B2
(45) Date of Patent: Aug. 3, 2021

(54) VEHICLE TPMS SECURITY STRATEGY

(71) Applicant: Continental Automotive Systems Inc., Auburn Hills, MI (US)

(72) Inventors: Jason Schwegler, Grand Blanc, MI (US); Troy Bartz, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 125 days.

(21) Appl. No.: 16/720,562

(22) Filed: Dec. 19, 2019

(65) Prior Publication Data

US 2020/0207163 A1 Jul. 2, 2020

Related U.S. Application Data

(60) Provisional application No. 62/785,278, filed on Dec. 27, 2018.

(51) Int. Cl.

| | |
|---|---|
| ***B60C 23/04*** | (2006.01) |
| ***G01L 17/00*** | (2006.01) |
| ***H04L 9/08*** | (2006.01) |

(52) U.S. Cl.

CPC ........ *B60C 23/0416* (2013.01); *G01L 17/005* (2013.01); *H04L 9/0819* (2013.01)

(58) Field of Classification Search

CPC .. G01M 17/02; G01M 17/021; G01M 17/022; G01M 17/027; G01M 17/025; G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 23/0406; B60C 23/0416; B60C 23/0433; B60C 23/0455;

(Continued)

(56) References Cited

U.S. PATENT DOCUMENTS

| | | | |
|---|---|---|---|
| 5,731,756 | A | 3/1998 | Roddy |
| 7,822,206 | B2 | 10/2010 | Birk et al. |

(Continued)

FOREIGN PATENT DOCUMENTS

| | | | | |
|---|---|---|---|---|
| CN | 102285306 | A | 12/2011 | |
| CN | 108407556 | A * | 8/2018 | ......... B60C 23/0472 |
| EP | 1043179 | A2 | 10/2000 | |
| EP | 2719551 | A1 | 4/2014 | |
| WO | 02057097 | A2 | 7/2002 | |

*Primary Examiner* — Andre J Allen

(57) ABSTRACT

An apparatus and method include, among other things, providing a plurality of sensors for a tire pressure monitoring system where each sensor is associated with tire parameter properties and has sensor parameters. Each sensor has a unique initial identification. A new unique identification is automatically generated for each sensor to replace the initial identification in response to a predetermined condition that is associated with at least one sensor parameter.

20 Claims, 4 Drawing Sheets

Vehicle TPMS Security Strategy Transmit only Sensors

20 B B B B 14a 14b 14c 14d 22 22 22 22 10 10 20 20 C 12a 14a 16a P1 14b P2 16b 12b 14c 12c 16c P3 ID_Front_Right0 ID_Front_Left0 ID_Rear_Left0 12a 14a 16a' P1 14b P2 16b' 12b 14c 16c' 12c P3 ID_Front_Right1 ID_Front_Left1 ID_Rear_Left1

(58) Field of Classification Search

CPC ............ B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 9/005; B60C 9/18; B60C 9/1807; B60C 9/20; B60C 9/28

USPC ................................................. 73/146–146.8

See application file for complete search history.

(56) References Cited

U.S. PATENT DOCUMENTS 9,296,266 B1 * 3/2016 Chen .................. B60C 23/0471
2003/0227379 A1 * 12/2003 Itou .................... B60C 23/0472 340/442
2004/0031317 A1 * 2/2004 Norimatsu .......... B60C 23/0416 73/146.4
2005/0099282 A1 * 5/2005 Taguchi ............. B60C 23/0466 340/445
2008/0018448 A1 1/2008 Ghabra et al.
2010/0207754 A1 * 8/2010 Shostak ............. B60C 23/0494 340/450
2011/0304454 A1 * 12/2011 Lickfelt ............... B60C 23/044 340/447
2012/0089299 A1 * 4/2012 Breed ................... B60N 2/888 701/36
2012/0194333 A1 * 8/2012 Kessler .................. B60C 23/06 340/445
2013/0120127 A1 * 5/2013 Sun .................... B60C 23/0437 340/447
2020/0361253 A1 * 11/2020 Qiu .................... B60C 23/0472

* cited by examiner

VEHICLE TPMS SECURITY STRATEGY

PRIORITY CLAIM

This application claims the benefit of U.S. Provisional Application No. 62/785,278 filed on Dec. 27, 2018.

TECHNICAL FIELD

The subject disclosure is directed to an apparatus and method for obscuring Tire Pressure Monitoring System (TPMS) data such that vehicle locations cannot be tracked for unintended purposes, and to prevent data spoofing of false tire information from a source outside of an associated vehicle.

BACKGROUND

A Tire Pressure Monitoring System (TPMS) is an electronic system that monitors tire air pressure. The TPMS reports real-time tire pressure information to a vehicle user via a graphic display, a gauge, or a warning light. The target of a TPMS is avoiding traffic issues, poor fuel economy, and increased tire wear due to under-inflated tires through early recognition of an improper state of the tires. There are two different types of TPMS: direct (dTPMS) and indirect (iTPMS). An indirect TPMS does not use physical pressure sensors but instead measures air pressures by monitoring individual wheel rotational speeds and other signals available outside the tire itself. A direct TPMS employs pressure sensors on each wheel, either internal or external. The sensors physically measure the tire pressure in each tire and report it to a vehicle instrument cluster or a corresponding control system.

Traditionally, TPMS sensors are learned to the vehicle by utilizing wireless triggers or through a special learning time window with plausibility checks on the received data. Vehicles are now moving toward adoption of low power transmission protocols and hardware that are used on the consumer market (e.g. BlueTooth Low Energy (BLE)). With the selection of these types of wireless technologies, the ability to track individual users based on monitoring their vehicle wireless transmissions becomes available to the average person. In the past, with a large variety of proprietary protocols and non-standard encoding schemes, this level of tracking was much more expensive and logistically difficult to manage.

BLE technology is one example of an interface that is available to every person with a smart device or laptop computer. This makes it possible for the average person to monitor and track anyone who would be driving a vehicle that might use this or other similar future wireless interfaces as a medium to transmit TPMS data from their tires to their vehicle. Additionally, there may be a potential for the TPMS data to be overridden by an outside transmission. Thus, the TPMS data should be obscured so that it cannot be used to track the location of vehicles for unintended purposes, and to prevent outside sources from falsifying the TPMS data.

SUMMARY

An exemplary method includes, among other things, providing a plurality of sensors for a tire pressure monitoring system, each sensor being associated with tire parameter properties and having sensor parameters, and wherein each sensor has a unique initial identification; and automatically generating a new unique identification for each sensor to replace the initial identification in response to a predetermined condition that is associated with at least one sensor parameter.

In a further non-limiting embodiment of the foregoing method, the plurality of sensors comprise transmit only sensors.

In a further non-limiting embodiment of any of the foregoing methods, each sensor automatically generates the new unique identification each time the predetermined condition is met and transmits the new unique identification to a vehicle controller and/or to a remote access smart device.

In a further non-limiting embodiment of any of the foregoing methods, the predetermined condition comprises initiation of a vehicle rolling event.

In a further non-limiting embodiment of any of the foregoing methods, the method includes using the sensor parameters for each sensor such that the sensor can seed a randomization of the new unique identification to be transmitted to the vehicle controller for use during a subsequent drive cycle.

In a further non-limiting embodiment of any of the foregoing methods, the sensor parameters comprise one or more of sensor on time, sensor off time, sensor battery state of charge, sensor tire position.

In a further non-limiting embodiment of any of the foregoing methods, the method includes providing each sensor with a random number generator function to automatically generate the new unique identification.

In a further non-limiting embodiment of any of the foregoing methods, the random number generator function automatically resets the new unique identification after a defined interval.

In a further non-limiting embodiment of any of the foregoing methods, the plurality of sensors comprise transmit and receive sensors that communicate with a vehicle controller, and wherein a vehicle access device is authenticated to a vehicle for access or start to provide an authentication exchange, and wherein the authentication exchange triggers a TPMS random number seeding with access device parameters or sends new access device generated ID values directly to the plurality of sensors via an associated bi-directional interface.

In a further non-limiting embodiment of any of the foregoing methods, the plurality of sensors comprise transmit and receive sensors that communicate with a vehicle controller, and wherein the vehicle controller automatically generates the new unique identification each time the predetermined condition is met and transmits the new unique identification to each respective sensor.

In a further non-limiting embodiment of any of the foregoing methods, the predetermined condition is an ignition on event.

In a further non-limiting embodiment of any of the foregoing methods, the vehicle controller connects to each sensor through a wireless interface and automatically randomizes the new unique identification for each sensor to be communicated to each sensor for a given interval of the predetermined condition.

In a further non-limiting embodiment of any of the foregoing methods, the given interval of the predetermined condition comprises once per drive cycle.

In a further non-limiting embodiment of any of the foregoing methods, the method includes deploying an encryption secret key via a bi-directional interface between a vehicle controller and each sensor that obscures a part of each new unique identification in a payload of a message and encrypts data reported to the vehicle controller and/or to a remote access smart device.

An apparatus, according to yet another exemplary aspect of the present disclosure includes, among other things, a vehicle controller, a tire pressure monitoring system in communication with the vehicle controller, and a plurality of sensors for the tire pressure monitoring system. Each sensor is associated with tire parameter properties and has sensor parameters. Each sensor has a unique initial identification. A new unique identification for each sensor is automatically generated to replace the initial identification in response to a predetermined condition that is associated with at least one sensor parameter.

In a further non-limiting embodiment of the foregoing apparatus, the plurality of sensors comprise transmit only sensors, and wherein each sensor automatically generates the new unique identification each time the predetermined condition is met and transmits the new unique identification to the vehicle controller and/or to a remote access smart device.

In a further non-limiting embodiment of any of the foregoing apparatus, the sensor parameters are used for each sensor such that each sensor can seed a randomization of the new unique identification to be transmitted to the vehicle controller for use during a subsequent drive cycle, and wherein the sensor parameters comprise one or more of sensor on time, sensor off time, sensor battery state of charge, sensor tire position.

In a further non-limiting embodiment of any of the foregoing apparatus, the plurality of sensors comprise transmit and receive sensors that communicate with a vehicle controller, and wherein a vehicle access device is authenticated to a vehicle for access or start to provide an authentication exchange, and wherein the authentication exchange triggers a TPMS random number seeding with access device parameters or sends new access device generated ID values directly to the plurality of sensors via an associated bi-directional interface.

In a further non-limiting embodiment of any of the foregoing apparatus, the plurality of sensors comprise transmit and receive sensors that communicate with a vehicle controller, and wherein the vehicle controller automatically generates the new unique identification each time the predetermined condition is met and transmits the new unique identification to each respective sensor.

In a further non-limiting embodiment of any of the foregoing apparatus, the vehicle controller is configured to deploy an encryption secret key via a bi-directional interface between the vehicle controller and each sensor that obscures a part of each new unique identification in a payload of a message and encrypts data reported by each sensor to the vehicle controller.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION OF AN EMBODIMENT

Figure 1:
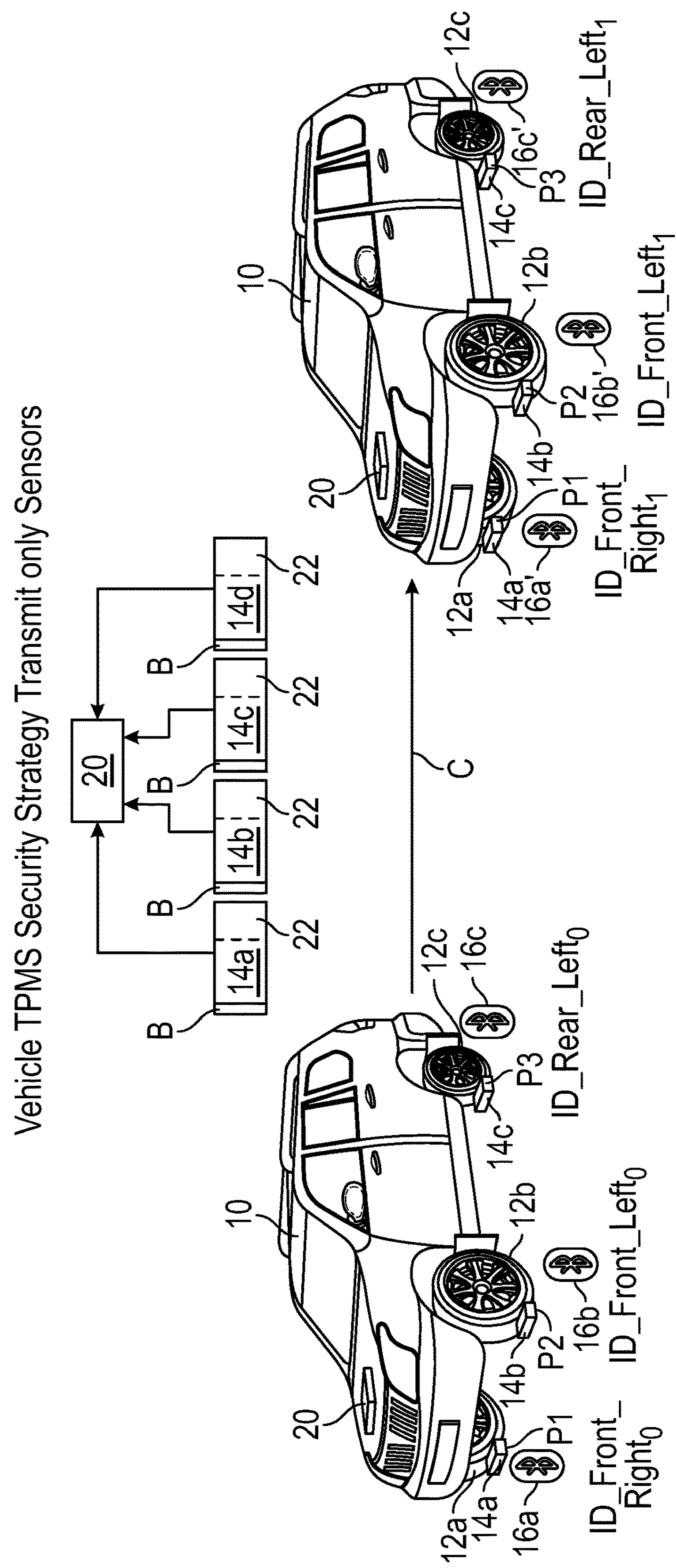
FIG. 1 shows a vehicle TPMS security strategy with transmit only sensors.

FIG. 1 shows a vehicle 10 having a plurality of tires 12*a*, 12*b*, 12*c*, etc., which have individual tire air pressures that are monitored by sensors 14*a*, 14*b*, 14*c*, etc. for a TPMS. A front right sensor 14*a* is used for the front right tire 12*a*, a front Left sensor 14*b* is used for the front left tire 12*b*, and a rear left sensor 14*c* is used for the rear left tire 12*c*. A rear right sensor 14*d* for the rear right tire is also included but the rear right tire cannot be seen in FIG. 1. The sensors 14*a*, 14*b*, 14*c*, 14*d* communicate with a vehicle controller 20. Each sensor 14*a*, 14*b*, 14*c*, 14*d* includes a sensor battery B and is positioned at a predetermined position P1, P2, P3, etc. associated with each tire. The vehicle controller 20 is configured to determine tire pressures, temperatures, motion, etc. based on received sensor data. The controller 10 also receives sensor parameter data for each sensor 14*a*, 14*b*, 14*c*, 14*d*. A TPMS security strategy is provided to prevent such data from being used for unintended purposes.

The vehicle controller 20 can be a dedicated controller for the TPMS or can be a controller associated with other vehicle systems. The vehicle controller 20 can include a processor, memory, and one or more input and/or output device interfaces that are communicatively coupled via a local interface. The controller 20 may be a hardware device for executing software and can be a central or auxiliary processing unit, or generally any device for executing software instructions related to the TPMS security strategy.

Vehicles have implemented learning mechanisms within their current TPMS functionality, which allows the user to change one or more sensors on a vehicle and then drive away without performing a specific learning routine. These auto-learning features have been developed as a convenience feature to allow owners and third party installers to successfully install new sensors or swap seasonal tires that may have their own set of sensors without requiring special tools. The subject disclosure leverages the existing learning strategies for TPMS systems, but allows for the obscuring of the sensor IDs on a regular basis to restrict the ability for someone to track the vehicle using the TPMS ID broadcast. Also, it allows for the option of full encryption of the data to prevent altering received data when potential hackers may have access to such data during a given drive cycle.

In one example, an apparatus and a method includes providing a plurality of sensors 14*a*, 14*b*, 14*c*, 14*d* for a TPMS, wherein each sensor 14*a*, 14*b*, 14*c*, 14*d* has a unique initial identification, and automatically generating a new unique identification for each sensor 14*a*, 14*b*, 14*c*, 14*d* to replace the initial identification in response to a predetermined condition C. The predetermined condition can comprise, for example, a specified time interval, a vehicle operating condition, a vehicle drive cycle, etc.

In one example shown in FIG. 1, the plurality of sensors 14*a*, 14*b*, 14*c*, 14*d* comprise transmit only sensors such that only one-way communication to the vehicle controller is provided. In this configuration, the sensors do not receive transmissions from the vehicle controller 20. In the example of FIG. 1, each sensor 14*a*, 14*b*, 14*c*, 14*d* automatically generates its own new unique identification each time the predetermined condition, e.g. a new drive cycle and/or rolling event, is met and transmits the new unique identification to the vehicle controller 20.

In one example, this is accomplished by using parameters associated with each sensor 14*a*, 14*b*, 14*c*, 14*d* such that each sensor 14*a*, 14*b*, 14*c*, 14*d* can seed a randomization of the new unique identification to be transmitted to the vehicle controller 20 for use during a subsequent drive cycle. In addition to measuring tire parameter properties such as pressure, temperature, and motion, each sensor 14*a*, 14*b*, 14*c*, 14*d* can also determine sensor parameters including one or more of time (on time vs. sleep time), sensor battery state of charge, sensor position within the tire, etc., for example.

In another example, each sensor 14*a*, 14*b*, 14*c*, 14*d* is provided with a random number generator function, schematically indicated at 22, to automatically generate the new unique identification. The random number generator function 22 automatically resets the new unique identification after a defined interval. The defined interval can comprise predetermined period of time, a new drive cycle, etc.

Thus, in the disclosed embodiment of FIG. 1, the TPMS security strategy includes randomizing a transmitter ID from a sensor that the vehicle cannot directly communicate with. This is accomplished by using sensor parameters that are specific to sensor operation, such that the sensor can seed a randomization of the transmitted identifier for use during the next drive cycle, or by using a random number generator in each sensor that resets the identifier after a defined interval. FIG. 1 shows this change. As shown, there is an initial ID_Front_Right$_0$ (16*a*), an ID_Front_Left$_0$ (16*b*), and an ID_Rear_Left$_0$ (16*c*). Also included but not shown is an ID_Rear_Right$_0$. These IDs 16*a*, 16*b*, 16*c*, etc. comprise the initial unique identification for each sensor. Each sensor 14*a*, 14*b*. 14*c*, etc. then subsequently uses its unique measurements to independently generate a new ID or uses a pseudo-random number generator function to generate a new unique identification, e.g. ID_Front_Right$_1$ (16*a*'), ID_Front_Left$_1$ (16*b*'), and ID_Rear_Left$_1$ (16*c*'), etc.

Figure 2:
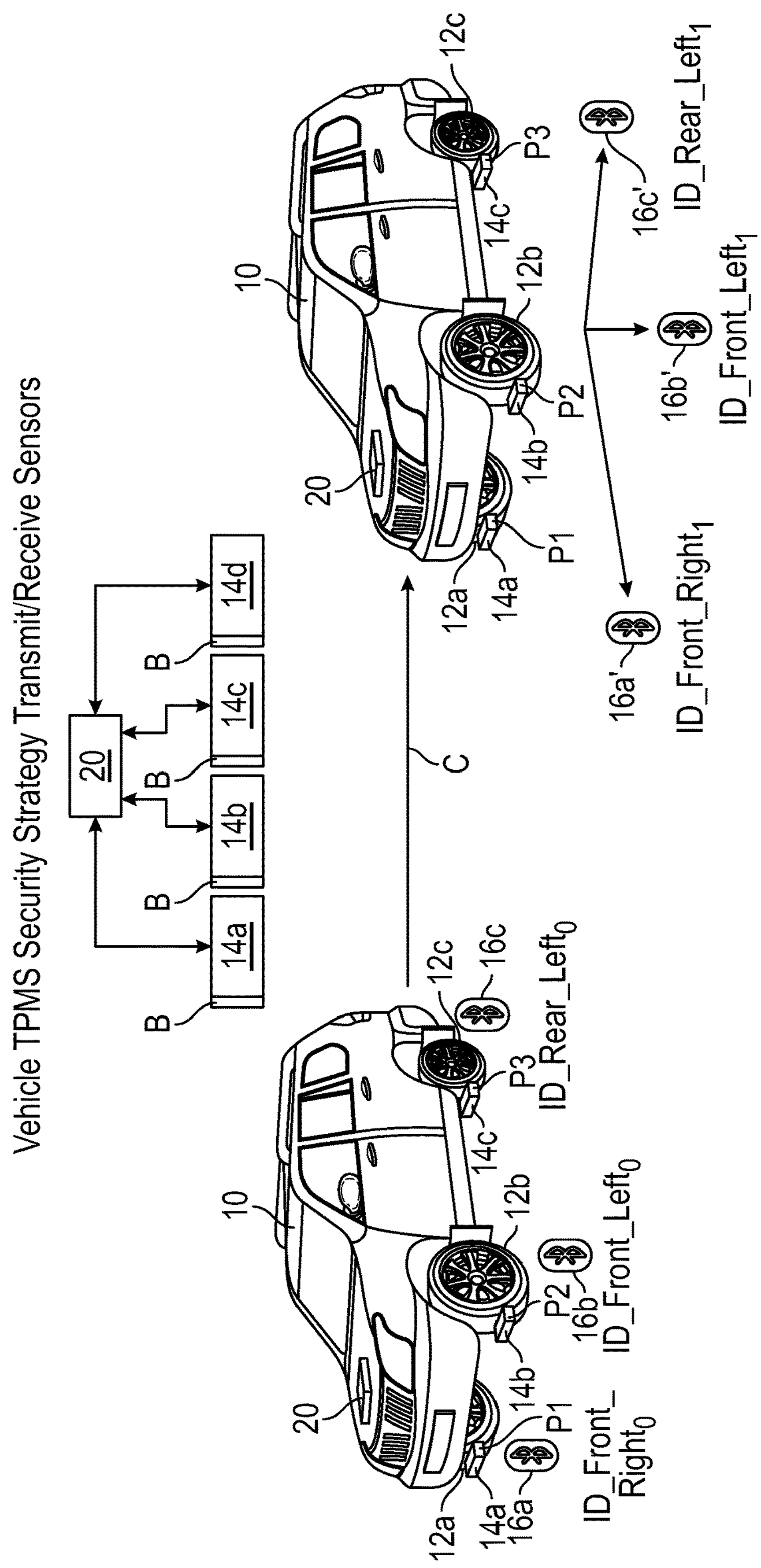
FIG. 2 shows a vehicle TPMS security strategy with transmit/receive sensors.

In another example shown in FIG. 2, the plurality of sensors 14*a*, 14*b*, 14*c*, 14*d* comprise transmit and receive sensors that have two-way communication with the vehicle controller 20. In this example, the vehicle controller 20 automatically generates the new unique identification each time the predetermined condition is met and transmits the new unique identification to each respective sensor 14*a*, 14*b*, 14*c*, 14*d*. The predetermined condition can comprise an ignition on event, for example, where the vehicle controller 20 generates and transmits the new unique identification for each sensor each time the ignition is activated. The controller 20 may also generate and transmit a new unique identification when a vehicle is placed in a PARK condition and/or once per drive cycle.

Thus, in the disclosed embodiment of FIG. 2, the TPMS security strategy includes randomizing a transmitter ID from the sensor that the vehicle can directly communicate to at a given interval, such as once per drive cycle for example. The vehicle can connect to the TPMS sensors 14*a*, 14*b*, 14*c*, 14*d* through a wireless interface and change or prepare the change of the transmitter ID for the beginning of the next interval. FIG. 2 shows this change from the initial unique identifications for each sensor, e.g. ID_Front_Right$_0$ (16*a*), ID_Front_Left$_0$ (16*b*), ID_Rear_Left$_0$ (16*c*), etc., to the new unique identification, e.g. ID_Front_Right$_1$ (16*a*'), ID_Front_Left$_1$ (16*b*'), and ID_Rear_Left$_1$ (16*c*'), etc. in response to the predetermined condition C. For example, for any given drive cycle of a determined amount of time, the vehicle 10 calculates the new unique identification, e.g. ID_Front_Right$_1$ (16*a*'), ID_Front_Left$_1$ (16*b*'), and ID_Rear_Left$_1$ (16*c*') for each sensor 14*a*, 14*b*, 14*c*, etc., and sends it at any time during the drive cycle.

Figure 3:
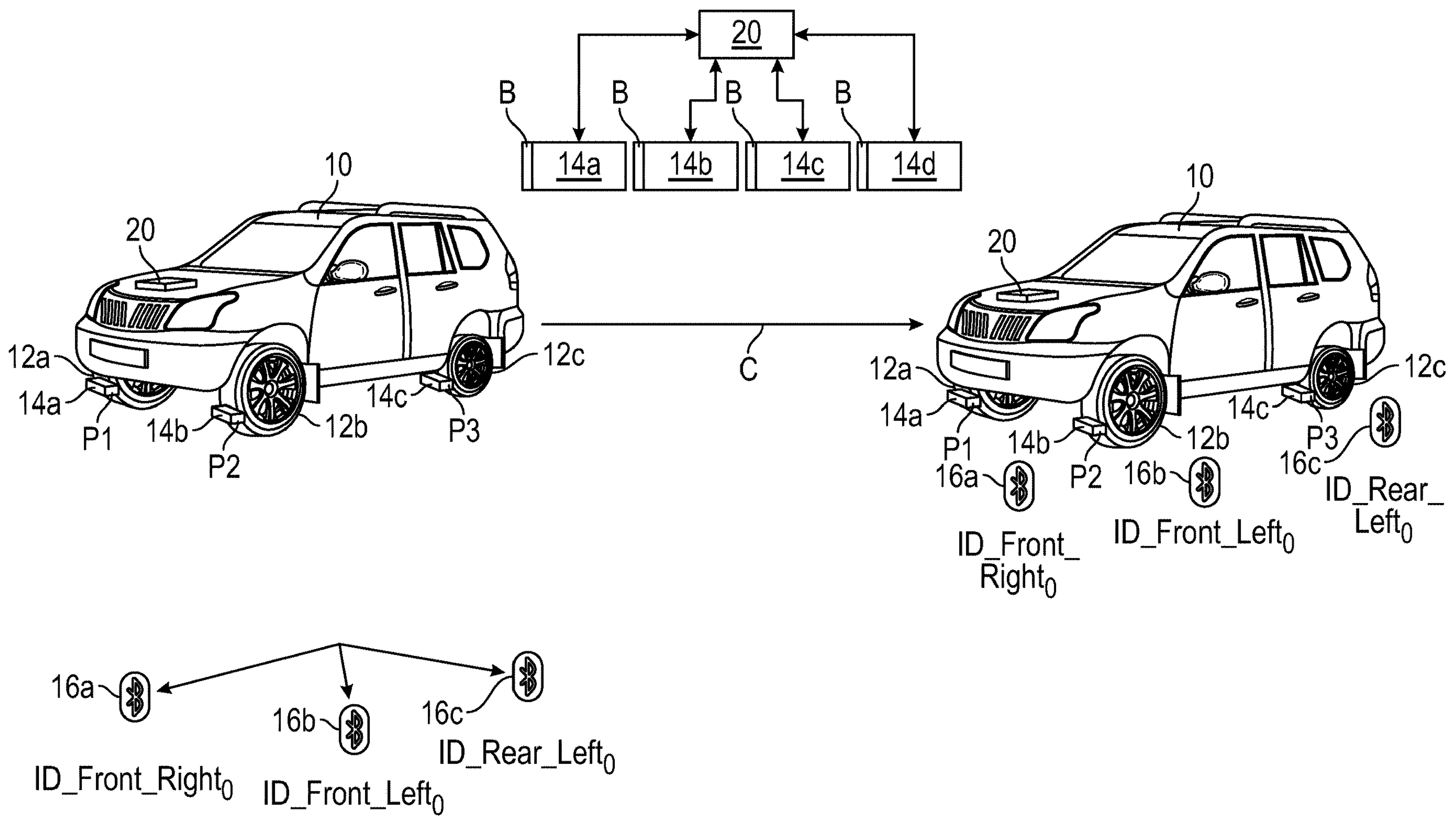
FIG. 3 shows a vehicle TPMS security strategy with encrypted sensor communication.

In another example shown in FIG. 3, the disclosed embodiment deploys an encryption secret key via the bi-directional interface that would obscure the part of the ID transmitted in the payload of the message, as well as obscuring the data being reported to the vehicle. This adds an additional level of security. The sensors in the embodiment of FIG. 3 have an initial unique identification. If the vehicle controller 20 subsequently detects an unlearned sensor, the vehicle controller 20 transmits a secret key to each sensor during the first few minutes of the drive cycle and/or after each ignition event to provide the new unique identification for each sensor, e.g. ID_Front_Right$_0$ (16*a*), ID_Front_Left$_0$ (16*b*), ID_Rear_Left$_0$ (16*c*), etc. The sensors 14*a*, 14*b*, 14*c*, 14*d* are then able to maintain this new identification as a constant ID (ID_Front_Right$_0$ (16*a*), an ID_Front_Left$_0$ (16*b*), and an ID_Rear_Left$_0$ (16*c*) due to the encryption of the most unique part of the ID.

Figure 4:
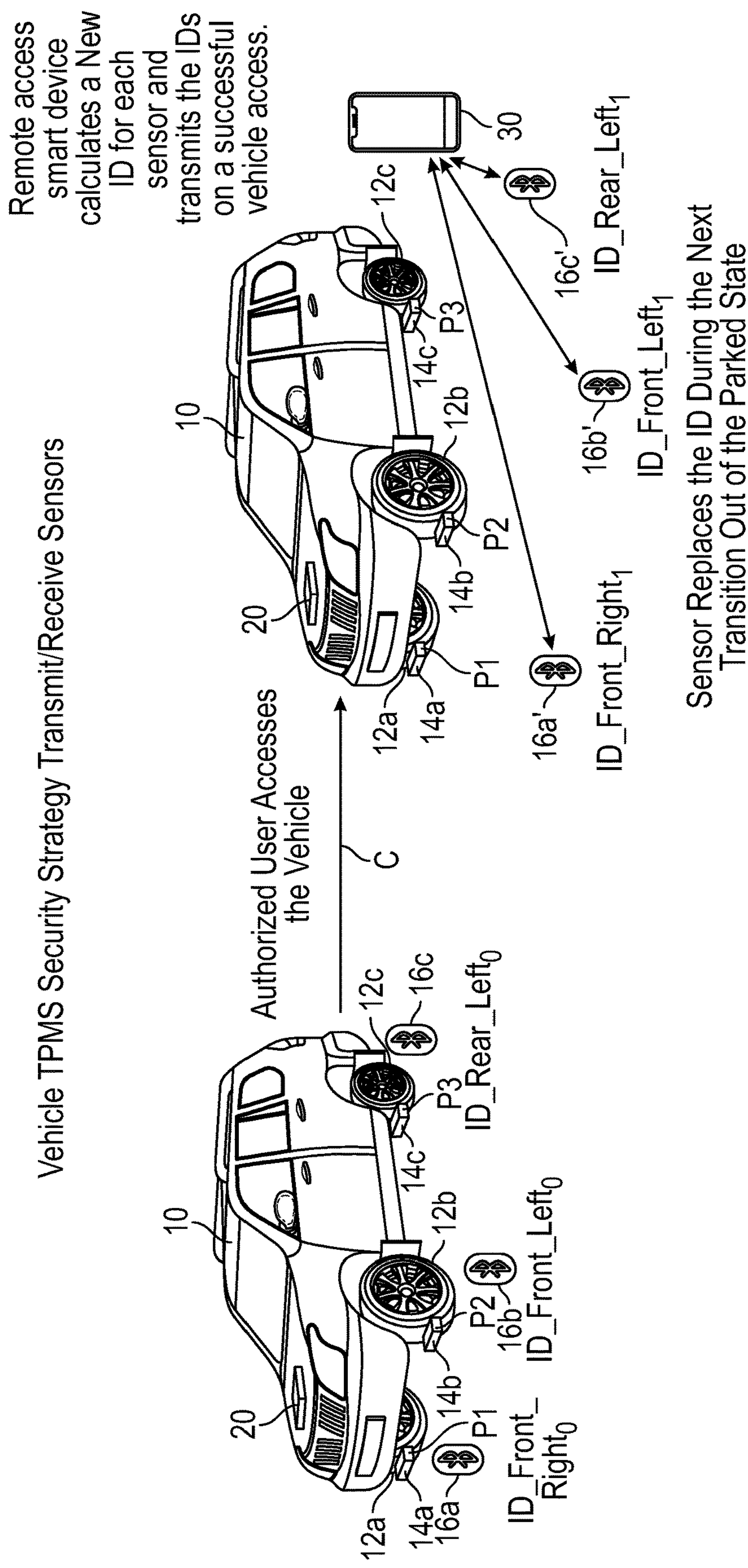
FIG. 4 shows a vehicle TPMS security strategy with transmit/receive sensors and a smart device.

In another example shown in FIG. 4, the disclosed embodiment deploys an encryption key or random number seed data via the shared bi-directional interface of a vehicle's access device 30 that would obscure the part of the ID transmitted in the payload of the message, as well as obscuring the data being reported to the vehicle 10. Access devices 30 often share radio frequencies with vehicle TPMS systems. This trend is expected to continue as BLE is capable of becoming a vehicle access protocol and offers additional convenience features with smart devices in the future. As the user authenticates their device to the vehicle 10 for access or start, this key exchange can trigger a TPMS random number seeding with access device parameters such as temperature, battery state of charge, encrypted data from the access or start authentication, GPS position, etc. or send new access device generated ID values, e.g. ID_Front_Right$_1$ (16*a*'), ID_Front_Left$_1$ (16*b*'), and ID_Rear_Left$_1$ (16*c*'), etc. for each sensor 14*a*, 14*b*, 14*c*, directly to the TPMS sensors through their shared interface.

TPMS implementations use a large variety of proprietary protocols and a variety of encoding schemes. Generally, the ability to use this data to track a specific vehicle would require a significant investment in time and material to build up a network of receivers. With the wide distribution of connected transceivers, e.g. BLE, it is possible to distribute malicious code to a variety of devices across a wide area, which could then report back vehicle location data. The subject disclosure provides a simple system and method that obscures vehicle location data such that the vehicle cannot be tracked and/or such that vehicle data cannot be changed for unintended purposes.

It should also be understood that although a particular component arrangement is disclosed in the illustrated embodiment, other arrangements would benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. A method comprising:

providing a plurality of sensors for a tire pressure monitoring system, each sensor being associated with tire parameter properties and having sensor parameters, and wherein each sensor has a unique initial identification; and automatically generating a new unique identification for each sensor to replace the initial identification in response to a predetermined condition that is associated with at least one sensor parameter.

2. The method according to claim 1, wherein the plurality of sensors comprise transmit only sensors.

3. The method according to claim 2, wherein each sensor automatically generates the new unique identification each time the predetermined condition is met and transmits the new unique identification to a vehicle controller and/or to a remote access smart device.

4. The method according to claim 3, wherein the predetermined condition comprises initiation of a vehicle rolling event.

5. The method according to claim 3, including using the sensor parameters for each sensor such that the sensor can seed a randomization of the new unique identification to be transmitted to the vehicle controller for use during a subsequent drive cycle.

6. The method according to claim 5, wherein the sensor parameters comprise one or more of sensor on time, sensor off time, sensor battery state of charge, sensor tire position.

7. The method according to claim 3, including providing each sensor with a random number generator function to automatically generate the new unique identification.

8. The method according to claim 7, wherein the random number generator function automatically resets the new unique identification after a defined interval.

9. The method according to claim 1, wherein the plurality of sensors comprise transmit and receive sensors that communicate with a vehicle controller, and wherein a vehicle access device is authenticated to a vehicle for access or start to provide an authentication exchange, and wherein the authentication exchange triggers a TPMS random number seeding with access device parameters or sends new access device generated ID values directly to the plurality of sensors via an associated bi-directional interface.

10. The method according to claim 1, wherein the plurality of sensors comprise transmit and receive sensors that communicate with a vehicle controller, and wherein the vehicle controller automatically generates the new unique identification each time the predetermined condition is met and transmits the new unique identification to each respective sensor.

11. The method according to claim 10, wherein the predetermined condition is an ignition on event.

12. The method according to claim 9, wherein the vehicle controller connects to each sensor through a wireless interface and automatically randomizes the new unique identification for each sensor to be communicated to each sensor for a given interval of the predetermined condition.

13. The method according to claim 12, wherein the given interval of the predetermined condition comprises once per drive cycle.

14. The method according to claim 1, including deploying an encryption secret key via a bi-directional interface between a vehicle controller and each sensor that obscures a part of each new unique identification in a payload of a message and encrypts data reported to the vehicle controller and/or to a remote access smart device.

15. An apparatus comprising:

a vehicle controller;

a tire pressure monitoring system in communication with the vehicle controller; and a plurality of sensors for the tire pressure monitoring system, each sensor being associated with tire parameter properties and having sensor parameters, and wherein each sensor has a unique initial identification, and wherein a new unique identification for each sensor is automatically generated to replace the initial identification in response to a predetermined condition that is associated with at least one sensor parameter.

16. The apparatus according to claim 15, wherein the plurality of sensors comprise transmit only sensors, and wherein each sensor automatically generates the new unique identification each time the predetermined condition is met and transmits the new unique identification to the vehicle controller and/or to a remote access smart device.

17. The apparatus according to claim 16, wherein the sensor parameters are used for each sensor such that each sensor can seed a randomization of the new unique identification to be transmitted to the vehicle controller for use during a subsequent drive cycle, and wherein the sensor parameters comprise one or more of sensor on time, sensor off time, sensor battery state of charge, sensor tire position.

18. The apparatus according to claim 15, wherein the plurality of sensors comprise transmit and receive sensors that communicate with a vehicle controller, and wherein a vehicle access device is authenticated to a vehicle for access or start to provide an authentication exchange, and wherein the authentication exchange triggers a TPMS random number seeding with access device parameters or sends new access device generated ID values directly to the plurality of sensors via an associated bi-directional interface.

19. The apparatus according to claim 15, wherein the plurality of sensors comprise transmit and receive sensors that communicate with a vehicle controller, and wherein the vehicle controller automatically generates the new unique identification each time the predetermined condition is met and transmits the new unique identification to each respective sensor.

20. The apparatus according to claim 15, wherein the vehicle controller is configured to deploy an encryption secret key via a bi-directional interface between the vehicle controller and each sensor that obscures a part of each new unique identification in a payload of a message and encrypts data reported by each sensor to the vehicle controller.

* * * * *